Dec. 29, 1970  H. S. VAN BUREN, JR  3,550,219
WIRING FASTENER
Filed Sept. 20, 1968

INVENTOR
HAROLD S. VAN BUREN JR.
BY
James R O'Connor
ATTORNEY

United States Patent Office 3,550,219
Patented Dec. 29, 1970

---

3,550,219
WIRING FASTENER
Harold S. van Buren, Jr., Lexington, Mass., assignor to United-Carr Incorporated, Boston, Mass., a corporation of Delaware
Filed Sept. 20, 1968, Ser. No. 761,059
Int. Cl. A44b *21/00*
U.S. Cl. 24—73                                 3 Claims

ABSTRACT OF THE DISCLOSURE

A one-piece, molded platsic device for securing a cable to an apertured supporting structure includes a resilient bushing adapted for snap seating in the supporting structure and a flexible strap having one end integral with the bushing and a free end which is adapted to be looped over the cable and threaded through the seated bushing. The bushing carries an integral, internal pawl and the strap has a plurality of ratchet teeth formed in its outer surface whereby the strap is tightened about the cable responsive to the interengagement of the pawl and a selected tooth on the strap.

BACKGROUND OF THE INVENTION

(1) Field of the invention

The invention relates to molded plastic fasteners for securing tubing, wiring, cables and the like elongate articles to an apertured supporting structure.

(2) Description of the prior art

Known flexible cable straps of the type disclosed herein can be generally grouped into three categories as follows:

(1) Straps for binding a group of cables or bundle of insulated wires together wherein one end of the strap carries ratchet teeth and the opposite end embodies a tooth-engaging locking device but wherein the strap is devoid of integral means for securing it to a supporting structure of means for receiving a separate supporting structure engaging fastener (see U.S. Pats. 2,979,794; 3,224,056; 3,197,829; 3,258,819; 3,102,311; and 3,368,247);

(2) Straps embodying ratchet teeth and locking devices according to category (1) above but also embodying integral plastic drive pin rivets for attaching the strap to a supporting strucure, or, alternatively, having openings for the receipt of one or more separately applied fasteners such as screws, metallic rivets, bolts, etc. (see U.S. Pats. 3,149,808; 3,302,913; and 2,936,980); and (3) Straps having a plurality of spaced openings in lieu of ratchet teeth formed therein and carrying an integral, push-in grommet for engaging an apertured supporting structure. Subsequent to the seating of the grommet in the support the strap is looped over the article to be fastened and passed over the protruding nose of the grommet. The opening in the strap through which the grommet is passed is selected to provide the tightest loop possible about the cable or a bundle of wires to be secured. In some instances a plug attached to the grommet by a second shorter strap is passed through the selected opening in the main strap after the latter has been looped around the wires, etc., and the plug is thereafter pressed into the bore in a hollow previously-seated grommet to complete the attachment (see U.S. Pats. 2,974,916; 2,937,834; and 3,269,680).

The instant device is seen to represent a substantial improvement over all of the known fasteners discussed above in that means for engaging an apertured supporting structure are provided as an integral part of the strap combination, thus eliminating the need for separately applied fasteners, and the pawl which engages the ratchet teeth on the strap is formed as an integral part of said means, to with a support engaging bushing, which improvement results in substantial cost savings which is realized in particular from the minimum time required to effect the attachment. In addition, the utilization of a pawl and ratchet teeth combination as opposed to spaced openings in the strap provides for maximum incremental adjustability in the strap.

The reader will further appreciate the contribution to the art of the present device by having reference to the detailed description of same which follows hereinafter.

SUMMARY OF THE INVENTION

According to the invention a device for securing tubing, wiring, cables and similar elongate articles to an apertured supporting structure comprises a resilient, support engaging bushing and a flexible strap having one end integral with the bushing and a free end remote from the bushing. The bushing includes a flexible pawl having a free end lying within the bushing and the strap has a plurality of ratchet teeth formed in the outer surface thereof. The strap is adapted to be looped around the article to be secured and threaded through the opening in the previously seated bushing with its free end leading and tightly secured about the article responsive to the engagement of a selected ratchet tooth on the strap with the pawl.

DESCRIPTION OF THE PREFERRED EMBODIMENT

Figure 1:
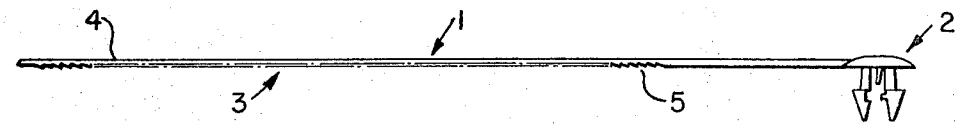
FIG. 1 is a side elevational view of a wiring fastener according to the invention.
Figure 2:
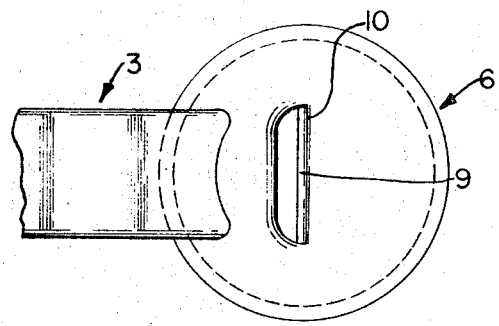
FIG. 2 is a top plan view of the wiring fastener with the strap partially broken away.

The fastening device 1 which is of molded, synthetic plastic construction, includes a bushing 2 adapted for press-snap seating in an apertured supporting structure and an integral, flexible strap 3 having one end attached to the bushing and a free end 4 disposed remote from the bushing in the pre-installation state depicted in FIG. 1. One side or surface of the strap 3 has a plurality of ratchet teeth 5 molded therein, which teeth extend from the free end 4 over the major portion of the length of the strap.

The bushing 2 has a radially enlarged, domelike head 6, a pair of opposed, resilient legs 7 which depend from the underside of the head 6 inwardly of its outer marginal edge, and a flexible pawl 8 which depends from the head 6 between the legs 7 and terminates in a tapering free end 9. The head 6 of the bushing has a through opening 10 molded therein, which opening has a length and width approximately equal to the width and thickness respectively of the strap 3. The opening 10 communicates with the gap 11 between the spaced legs 7 and the free end 9 of the pawl 8 normally lies within the lateral bounds of an imaginary extension of the longer sides of the opening 10 in the head.

Figure 3:
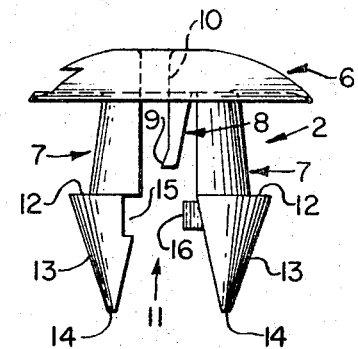
FIG. 3 is an enlarged side elevational view of the bushing of the fastener.
Figure 4:
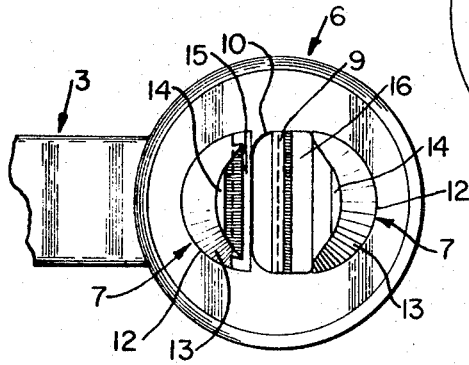
FIG. 4 is a bottom plan view of the fastener with the strap partially broken away.

Each of the legs 7 has an external, arcuate circumferential contour and each has an upper portion adjoining the head 6 which is generally frustoconical in vertical cross section and merges with the wider end of a generally wedge-shaped lower leg portion, which lower portion tapers progressively in both width and thickness from its upper end to its free end as is best seen in the plan view of the legs depicted in FIG. 4. An abrupt, radially extending shoulder 12 is formed in each leg outwardly of the intersection of the upper and lower portions thereof and each of the legs has a relatively steeply ramped outer surface 13 extending from its free end 14 upwardly and outwardly to the outer extremity of the shoulder 12. As best seen in FIG. 3 one of the legs has an undercut notch 15 molded therein and the other leg has a lug 16 molded thereon and extending laterally into the gap 11 in registration with the notch 15.

Figure 5:
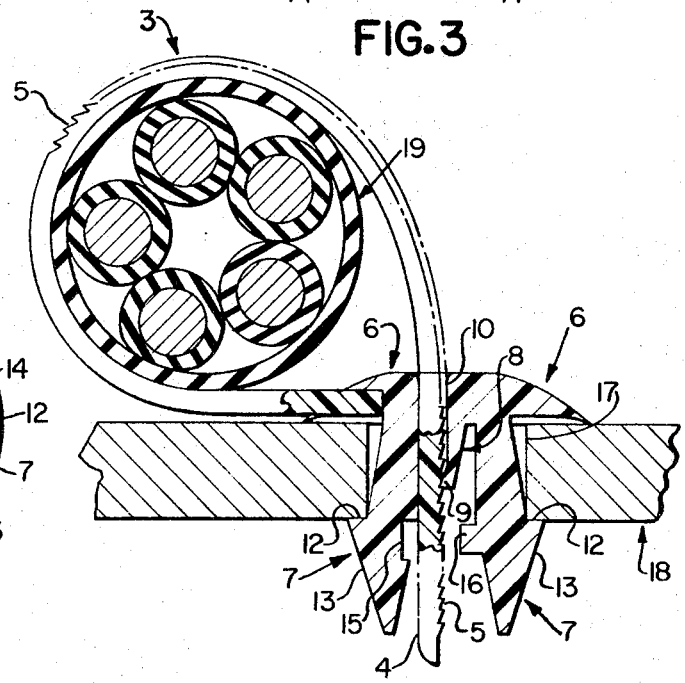
FIG. 5 is a side elevational view, with certain elements being depicted in cross section, of an installation depicting the fastener as employed to secure a plurality of sheathed insulated wires to an apertured supporting structure.

In the typical installation depicted in FIG. 5, the bushing 2 is initially manually pressed into the circular opening 17 in the supporting structure 18 with the free ends 14 of the legs 7 leading. The diameter of the opening 17 is ideally approximately equal to the distance across the inboard edges of the shoulders 12 on the legs 7. Thus as the bushing passes through the opening 17, the legs are flexed toward each other to the extent that the inboard upper ends of their lower portions practically come together as the outwardly ramped surfaces 13 are cammed inwardly by the wall defining the opening 17. When the shoulders 12 clear the remote surface of the supporting structure, the legs immediately spring outwardly to the unflexed condition and in cooperation with the undersurface of the head, which then lies flush against the proximate surface of the supporting structure, securely lock the bushing to the support. Since the lug 16 on the one leg freely passes into the notch 15 on the other leg there is no interference with the inward flexing of the legs during initial seating of the bushing.

Subsequent to the seating of the bushing, the elongate article to be secured, for example the sheathed bundle of insulated wires 19, is placed on the smooth surface of the strap adjacent the head 6, the strap is looped over the article, and its free end is threaded through the opening 10 in the head and pushed downwardly in the gap 11 between the legs. The free end 9 of the pawl 8 rides over the outwardly ramped surfaces of the teeth 5 on the strap until the latter is bound tightly around the article 19 at which point the pawl is in locked engagement with the ratchet tooth selected for the degree of tightness in the strap desired. In situations where the surface of the supporting structure 18 remote from the head 6 of the bushing is available, the free end of the strap may be grasped and pulled down between the legs for final tightening about the secured article.

From a further consideration of FIG. 5, the reader will appreciate that the disposition of the end portion 4 of the strap between the legs 7 of the bushing and between the lugs 16 and the notch 15 provides an additional safety feature in the fastening device. Since, as earlier stated, the inboard upper edges of the lower portions of the legs 7 must substantially come together during initial insertion of the bushing in order for the shoulders 12 to pass through and beyond the opening 17, it becomes obvious that the end portion 4 of the strap acts as a barrier which will prevent the lugs 16 from reentering the notch 15, or even in the absence of the notch and lug will inhibit inward flexing of the legs to the extent necessary for the shoulders 12 to move back into the area defined by the opening 17 in the supporting structure. Thus, the present fastening device, by design, includes an improved locking feature which effectively prohibits accidental disengagement of the bushing 2 from the structure to which it is attached.

I claim:

1. A device for securing tubes, wires, cables and the like elongate articles to an apertured supporting structure comprising a resilient bushing having an enlarged head and opposed, spaced, resilient legs extending from the underside of said head, said legs having intermediate, outwardly extending shoulders cooperable with the undersurface of said head in engaging the outer surfaces of the supporting structure adjacent the aperture therein, whereby said bushing is adapted to be snappingly seated and retained in the aperture in the supporting structure, and a flexible strap having one end secured to the bushing, and a free end initially remote from said bushing, said bushing additionally including a flexible pawl which is capable of being deflected independently of any coincident deflection of said legs on said bushing, said pawl being integrally joined to the said head of said bushing and extending from said head in the same general direction as said legs between the opposed internal surfaces of said legs and terminating in a free end disposed intermediate the ends of said legs, said free end of said pawl lying closer to said head of said bushing than said shoulders on said legs, said strap having a plurality of ratchet teeth formed in a surface thereof, said strap being adapted to be looped around the article to be secured and threaded through the bushing with its free end leading and tightly secured about the article responsive to the engagement of a selected ratchet tooth with said pawl.

2. A device according to claim 1 wherein said legs taper progressively inwardly from said shoulders to a minimum width at their ends remote from said head to facilitate passage of said bushing into and through the aperture in the supporting structure.

3. A device according to claim 1 wherein one of said legs has a notch formed in its internal surface and another of said legs carries an internal, laterally extending lug disposed opposite and in registration with said notch in said one leg, said lug being capable of lateral movement into said notch to permit said legs to be flexed toward each other to the extent necessary for relatively easy passage of said legs through the aperture in the supporting structure during seating of said bushing in the structure, said strap being disposed between said lug and said notch to inhibit flexing of said legs toward each other to the extent necessary to prohibit accidental unseating of said bushing when said strap is in tightened article securing engagement with said pawl.

References Cited

UNITED STATES PATENTS

| 2,397,680 | 4/1946 | Morehouse | 24—73X |
| 2,969,216 | 1/1961 | Hallsey | 24—16X |
| 3,157,377 | 11/1964 | Orenick | 24—73X |
| 3,186,047 | 6/1965 | Schwester et al. | 24—16 |

FOREIGN PATENTS

| 1,267,508 | 6/1961 | France | 24—73 |

J. KARL BELL, Primary Examiner

U.S. Cl. X.R.

248—74